US012811467B2

(12) United States Patent
Zhan et al.

(10) Patent No.: US 12,811,467 B2
(45) Date of Patent: Nov. 24, 2026

(54) METHOD AND SYSTEM FOR ELECTRICITY GENERATION USING ASSOCIATED GAS

(71) Applicant: CHINA PETROLEUM & CHEMICAL CORPORATION, Beijing (CN)

(72) Inventors: Sheng Zhan, Houston, TX (US); Huanquan Sun, Houston, TX (US); Yongqiang Zhao, Houston, TX (US)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 0 days.

(21) Appl. No.: 19/001,130

(22) Filed: Dec. 24, 2024

(65) Prior Publication Data

US 2026/0180399 A1 Jun. 25, 2026

(51) Int. Cl.

| | |
|---|---|
| ***H02K 7/18*** | (2006.01) |
| ***E21B 41/00*** | (2006.01) |
| ***E21B 43/34*** | (2006.01) |
| ***F02C 1/05*** | (2006.01) |
| ***H01M 8/04082*** | (2016.01) |
| ***H01M 8/04119*** | (2016.01) |

(Continued)

(52) U.S. Cl.

CPC ....... *H02K 7/1823* (2013.01); *E21B 41/0071* (2013.01); *E21B 43/34* (2013.01); *F02C 1/05* (2013.01); *H01M 8/04164* (2013.01); *H01M 8/04201* (2013.01); *H01M 8/0675* (2013.01); *H01M 8/1246* (2013.01); *H01M 8/145* (2013.01); *F05D 2220/76* (2013.01); *H01M 2008/1293* (2013.01); *H01M 2008/147* (2013.01); *H01M 2250/10* (2013.01); *H01M 2250/402* (2013.01)

(58) Field of Classification Search

CPC ... H02K 7/1823; E21B 41/0071; E21B 43/34; F02C 1/05; H01M 8/04164; H01M 8/04201; H01M 8/0675; H01M 8/1246; H01M 8/145; H01M 2008/1293; H01M 2008/147; H01M 2250/10; H01M 2250/402; F05D 2220/76

See application file for complete search history.

(56) References Cited

U.S. PATENT DOCUMENTS 6,456,902 B1 * 9/2002 Streetman ............ E21B 43/121 700/282
7,803,473 B2 * 9/2010 Balan ................ H01M 8/04111 426/426

(Continued)

*Primary Examiner* — Jesse S Bogue

(74) *Attorney, Agent, or Firm* — NKL Law; Allen Xue

(57) ABSTRACT

A system for utilizing oil field associated gas to generate electricity includes a central power station; a plurality of well sites connected to the central power station through a network of pipelines; and a local power grid that connects the central power station to the plurality of well sites. The central power station has a flare system having a flare stack, a gas purification system for removing impurities in the associated gas, e.g., sulfur compounds, a gas storage system for storing associated gas, one or more electric generators, and one or more high-temperature fuel cell stack. Each well site has a wellhead associated gas processing system that collects and processes an associate gas stream released from the well and to deliver the associated gas through the network of pipeline system to the central power station.

10 Claims, 3 Drawing Sheets

(51) Int. Cl.

| | |
|---|---|
| ***H01M 8/0662*** | (2016.01) |
| ***H01M 8/1246*** | (2016.01) |
| ***H01M 8/14*** | (2006.01) |
| *H01M 8/12* | (2016.01) |

(56) References Cited

U.S. PATENT DOCUMENTS

| | | | | |
|---|---|---|---|---|
| 9,077,008 | B2 * | 7/2015 | Berlowitz | H01M 8/0637 |
| 9,755,258 | B2 * | 9/2017 | Berlowitz | H01M 8/04014 |
| 9,966,621 | B2 * | 5/2018 | Kobayashi | H01M 8/0618 |
| 10,465,492 | B2 * | 11/2019 | Ricotta | C10L 3/101 |
| 10,892,507 | B2 * | 1/2021 | Jahnke | H01M 8/145 |
| 11,094,948 | B2 * | 8/2021 | Wach | H01M 8/04097 |
| 12,040,513 | B2 * | 7/2024 | Chen | H10N 10/13 |
| 12,234,712 | B2 * | 2/2025 | Zhang | E21B 43/2607 |
| 2010/0028730 | A1 * | 2/2010 | Ghezel-Ayagh | F02G 1/04 429/444 |
| 2016/0053991 | A1 * | 2/2016 | Briggs | E21B 43/24 122/6 R |
| 2017/0271701 | A1 * | 9/2017 | Berlowitz | H01M 8/04805 |
| 2020/0063531 | A1 * | 2/2020 | Tuma | B01D 53/002 |
| 2022/0307424 | A1 * | 9/2022 | Wang | F23R 3/36 |
| 2023/0183588 | A1 * | 6/2023 | Al-Qahtani | C10L 3/104 423/302 |
| 2023/0407182 | A1 * | 12/2023 | Lentz | C25B 1/50 |
| 2024/0279563 | A1 * | 8/2024 | Blaies | F01K 17/06 |
| 2024/0426267 | A1 * | 12/2024 | McHugh | F03B 13/08 |

* cited by examiner

METHOD AND SYSTEM FOR ELECTRICITY GENERATION USING ASSOCIATED GAS

TECHNICAL FIELD

The present disclosure relates generally to oil and gas exploration, and specifically to generating electricity using associated gas released during oil drilling in the field.

BACKGROUND OF THE INVENTION

Associated gas (aka. associated petroleum gas) refers to a gaseous mixture, primarily natural gas, released from oil deposits during drilling. Due to the fact that oil fields are often located in remote areas and the difficulties in collecting, processing, and/or storing the associated gas, most of the associated gas is flared or vented. Gas flaring is usually a controlled burn of combustible gas carried out using a flare stack. Gas flaring is practiced for a variety reasons, from operational to market and economic. Typical operational reasons include stabilizing pressure and flow when testing a well; managing waste gas; and for safety or emergency situations to release pressure. However, flaring not only burns off valuable energy sources but also generates greenhouse gas emissions. According to World Bank, the amount of gas currently flared each year is about 148 billion cubic meters, which generates 350 million tons of $CO_2$-equivalent emissions annually.

Further, a significant portion of the associated gas is vented without being combusted. Venting may be caused by deficiencies in flare system that result in incomplete combustion of the associated gas. Since the associated gas is mainly methane. Since methane is much more potent in trapping heat, venting of the associated gas represents a significant portion of green house gases. About 95% of the gas flaring are non-emergency flaring. Accordingly, reducing flaring and venting, especially non-emergency routine flaring, could be an effective approach to reduce green house gases.

The energy industry traditionally collects and transports some of the associated gas for further processing, whose viability is limited by the scale and cost of the collection and transportation. Reinjecting associated gas into the oil field has also been practiced, which enhances the oil production at a high cost. In addition, associated gas is also captured to generate electricity onsite. Each approach has limitations and potentials. While economic constraints are persistent, options to manage the cost need to be intensively investigated. Any long-term solution for reducing gas flaring needs to be economically viable. Accordingly, new methods and systems are needed to more efficiently utilize the associated gas and reduce gas flaring.

SUMMARY

The present disclosure, in one of its embodiments, provides a system for utilizing oil field associated gas. The system includes a central power station; a plurality of well sites connected to the central power station through a network of pipelines; and a local power grid that connects the central power station to the plurality of well sites.

The central power station has a flare system having a flare stack, a gas purification system for removing impurities in the associated gas, e.g., sulfur compounds, a gas storage system for storing associated gas, one or more electric generators, and one or more high-temperature fuel cell stacks.

Each well site has a wellhead associated gas processing system that collects and processes an associate gas stream released from the well and to deliver the associated gas through the network of pipeline system to the central power station.

In some embodiments, the wellhead associated gas processing system includes a gas-liquid separator that separates the associated gas from water and/or oil released from the well. The wellhead associated gas processing system also includes a flare stack that burns the associated gas during exigencies, such as an emergency release of associated gas during the drilling operation or from a storage tank at the wellsite.

In other embodiments, the water-depleted associated gas is fed into the storage tank, which is connected to a compressor, while the inlet of the compressor is connected to the storage tank and the outlet is connected to the network of the pipelines.

In still other embodiments, the high-temperature fuel cell stack is a solid oxide fuel cell (SOFC) stack or a molten carbonate fuel cell (MCFC) stack. Or, the system has both the SOFC stack and the MCFC stack.

In still some embodiments, the gas purification system in the central power station includes a desulfurization unit. The desulfurization unit includes a wet gas scrubber. The desulfurization unit may also contain a pressure swing adsorption (PSA) unit to further removing impurities from the associated gas before its entry into the high-temperature fuel cell stack.

In more of the embodiments, the electric generator can be a gas turbine generator that combusted the associated gas to generate electricity. The electric generator can also be a bi-fuel generator that uses diesel, the associated gas, or a mixture of diesel and associated gas.

In still another embodiment, the system include a steam turbine driven by a high-temperature steam at temperature of 500-600° C. The high-temperature steam is generated in a steam generator heated by an exhaust gas. The exhaust gas is from the SOFC stack, the MCFC stack, or the electric generator. The exhaust gas can also be a mixture of exhaust gases from two or three of the SOFC stack, the MCFC stack, and the electric generator.

In the embodiments, the electricity generated in the central power station is sent through the local grid to be distributed to the plurality of well sites to provide electric power the drilling operation.

The disclosure also provides a method for utilizing wellhead associated gas to generate electricity instead of flaring the associated gas. The method includes the steps of processing at each of the plurality of well sites the associated gas generated at the well site to remove water therein to obtains a plurality of processed associated gas streams; combining and delivering the plurality of processed associated gas streams to the central power plant through the network of pipelines; purifying the processed associated gas to remove sulfur compounds therein to obtain a sulfur-free associate gas; feeding the sulfur-free associate gas to the one or more high-temperature fuel cell stack to generate electricity; and supplying the electricity to the local power grid that connects the central power station to the plurality of well sites. Used herein the term "sulfur-free" means a sulfur level less than 1000 ppm, preferably 100 ppm, 50 ppm, or most preferably less than 10 ppm.

According to one aspect of the method, the unpurified associated gas may be used to drive a gas turbine, or drive a bi-fuel generator together with diesel. According to another aspect of the method, when the trace amount of sulfur in the sulfur-free associated gas exceeds the tolerance level of sulfur in the SOFC stack or in the MCFC, the associated gas fuels the gas turbine or fuels the bi-fuel generator together with diesel.

According to still another aspect of the method, the sulfur-free associated gas is stored in a gas storage tank and delivered to the electricity generator and/or the high-temperature fuel cell from the gas storage tank.

BRIEF DESCRIPTION OF THE DRAWINGS

The teachings of the present disclosure can be readily understood by considering the following detailed description in conjunction with the accompanying drawings.

DETAILED DESCRIPTION

Figure 1:
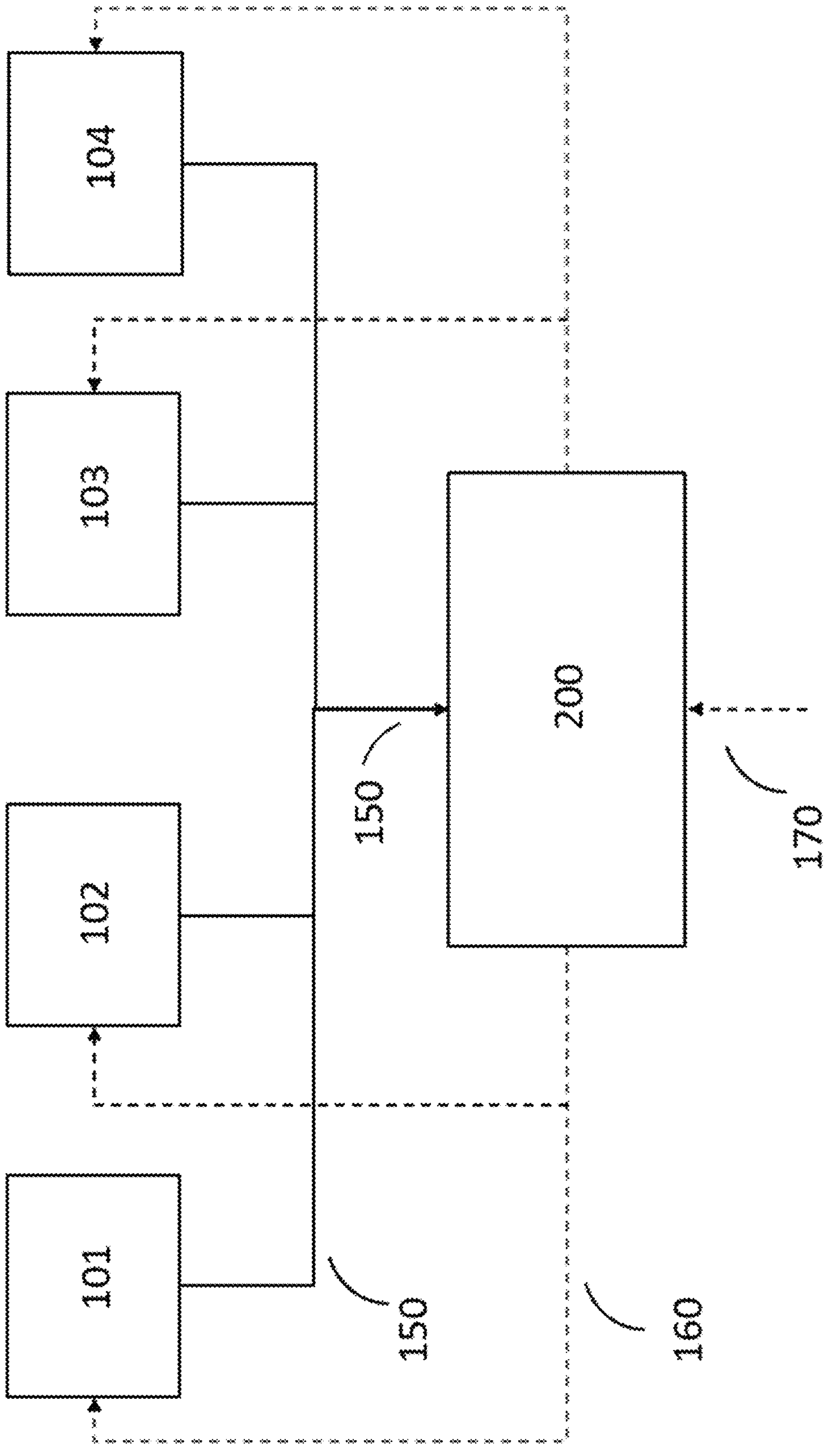
FIG. 1 is a block diagram illustrating the system for utilizing the associated gas for electric power generation according to an embodiment.

Reference will now be made in detail to embodiments of the present disclosure, examples of which are illustrated in the accompanying drawings. It is noted that wherever practicable, similar or like reference numbers may be used in the drawings and may indicate similar or like elements.

The drawings depict embodiments of the present disclosure for purposes of illustration only. One skilled in the art would readily recognize from the following description that alternative embodiments exist without departing from the general principles of the disclosure.

Throughout the specification, the terms approach(es), method(s), and technology are used interchangeably and have the same meaning.

Throughout the specification, the term power refers to electric power.

FIG. 1 is a schematic illustration of the system for utilizing the associate gas for electric power generation according an embodiment in this disclosure. The system includes a plurality of well sites 101-104, also referred to as well pads. Each well site is located in the proximity of one or more production wells that produce oil and associated gas. The gas processing system at the well site contains a separator that separates the associated gas from oil and water. The separator can be any known gas-liquid separation system. It can be a conventional separator with a de-entrainment mesh followed by a dehydration system using glycol as a medium to remove water. The well site may also have a gas storage tank, e.g., a surge tank, that stores the processed gas. A compressor draws the processed gas from the gas storage tank and delivers it through a network of pipelines 150 to the central power station 200. The gas processing system may also include a flare stack that burns associated gas when needed.

The central power station 200 generates electricity using the associated gas and distributing the electricity to the plurality of well sites 101-104 through a local grid 160, shown as broken lines in FIG. 1. The central power station 200 may also connected to an electrical grid 170 that transmits electricity generated elsewhere to the central power station 200, provided that the electrical grid 170 is accessible. In that case, the electrical grid 170 may supplement the central power station 200 when it cannot meet the power demand. Conversely, the central power station 200 may also supply excess electricity to the electrical grid 170.

Figure 2:
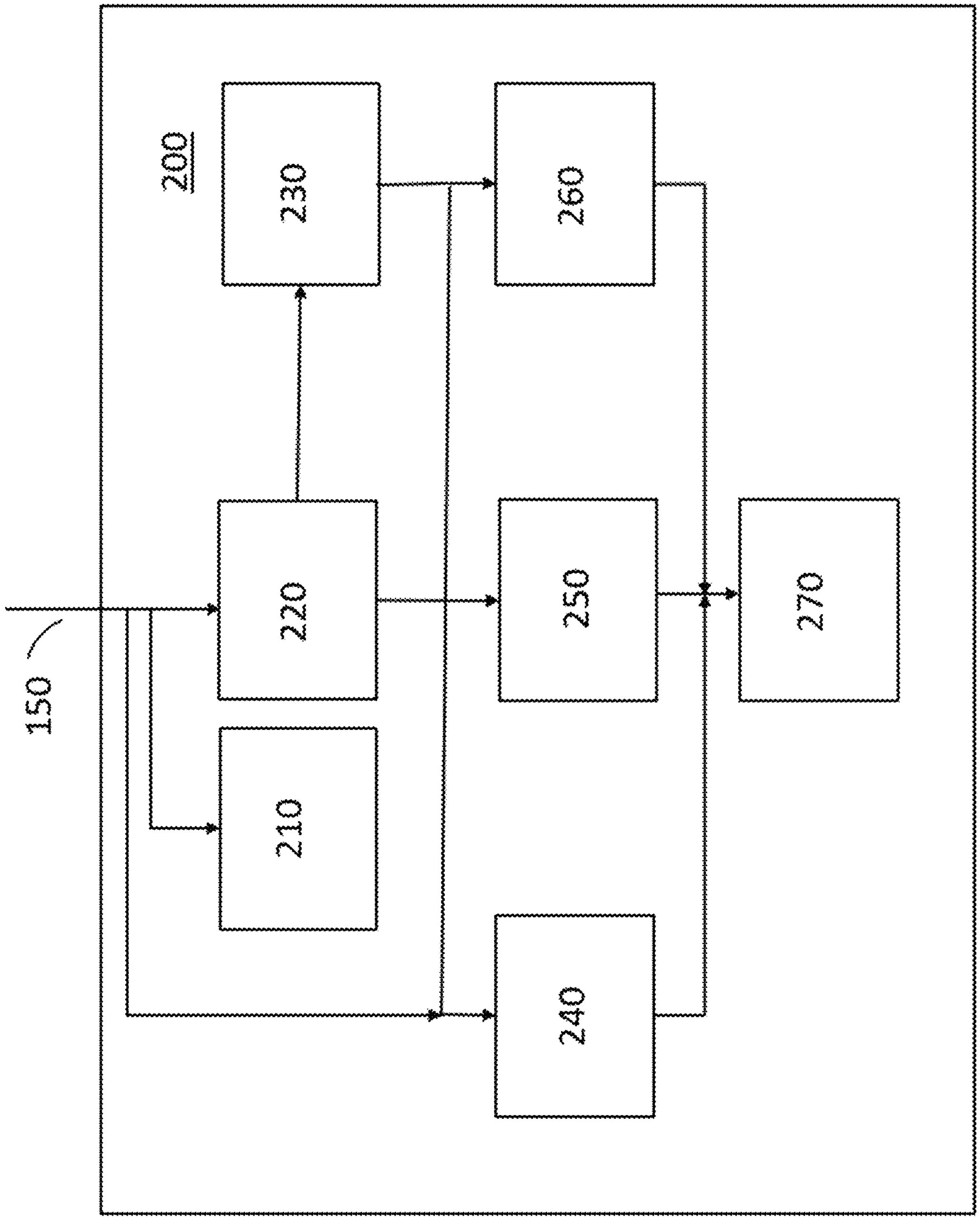
FIG. 2 is a block diagram showing the central power station according to some embodiments in this disclosure.

FIG. 2 shows an exemplary central power station 200 in this disclosure. It includes a flare system 210 that includes a flare stack, which burns excess associated gas during emergencies. The processed gas from the pipeline 150 is fed to the gas purification system 220 to remove impurities such as $H_2S$ and organosulfur. At least a portion of the purified associated gas is stored in a gas storage tank 230. The purified associated gas is fed to any of the electric generator 240, the solid oxide fuel cell stack (SOFC) 250, and molten carbonate fuel cell stack (MCFC) 260.

The electric generator 240 can use the purified associated gas as the fuel. The electric generator 240 can also be a bi-fuel generator that uses both the associated gas a diesel as the fuel. The SOFC operates at 800-1000° C. and can reach an efficiency of about 60%. The MCFC operates at about 600° C. and also has an efficiency of 60%. The exhaust temperature of the gas turbine can be about 500° C., while the temperatures of the exhaust gas from SOFC and MCFC can reach as high as 1000° C. and 600° C., respectively. The exhaust gas can be used to heat the steam generator to generate steam to drive the steam turbine 270 to produce electricity. Electricity generated in 240, 250, 260, and 270 are fed into the local grid 160 to be distributed to the well sites.

Figure 3:
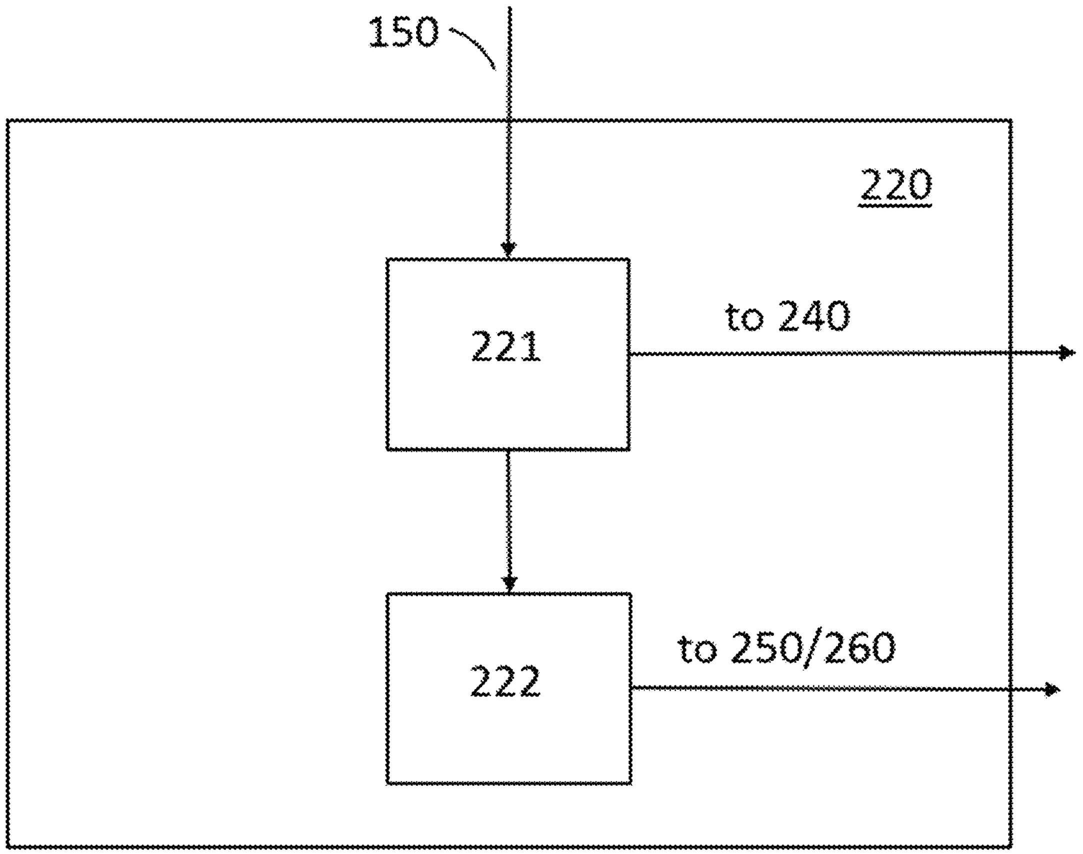
FIG. 3 is a block diagram showing the gas purification system according some embodiment in this disclosure.

Both SOFC and MCFC are susceptible to sulfur poisoning. As such, the gas purification system 220 needs to reduce sulfur in the associated gas to ppm level. FIG. 3 shows an exemplary embodiment of the gas purification system 220 that includes a wet gas scrubber 221 and a pressure swing adsorption device (PSA) 222. The wet gas scrubber 221 removes sulfur oxides and other impurities from the processed associated gas. The outlet of the scrubber 221 may be connected to the electric generator 240 so that the scrubbed associated gas can be directly used for in the electric generator 240. The scrubbed associated gas may also be fed into the PSA device 222. In the PSA device may contain an absorbent (zeolite, etc.) that absorbs sulfur compounds at a high pressure and releases the absorbed sulfur compounds at a lower pressure, thereby separating sulfur compounds from the associated gas to produce a sulfur-free associated gas to fuel the SOFC 250 or the MCFC 260.

Alternatively, as shown in FIG. 2, the processed associated gas may directly used to power the electric generator, e.g., a gas turbine, without being purified in the purification system 220.

It would be apparent to a person having ordinary skills in the art that variations of the method and system in the current disclosures are available without departing from the true scope of the disclosure, as defined in the claims set forth below.

What is claimed is:

1. A system for utilizing oil field associated gas, comprising:

a central power station;

a plurality of well sites connected to the central power station through a network of pipelines; and a local power grid that connects the central power station to the plurality of well sites, wherein the central power station comprises a flare system, one or more gas purification system, a gas storage system, one or more electric generators, one or more solid oxide fuel cell stack (SOFC), and one or more molten carbonate fuel cell stack (MCFC), wherein each well site has a wellhead associated gas processing system configured to collect and process an associated gas stream from said wellhead and to deliver the associated gas through the network of pipeline system to the central power station, wherein the central power station is configured to generate electricity using the associated gas received from the network of pipelines and to distribute the electricity to the plurality of well sites through the local grid, and wherein the one or more gas purification system comprises a wet gas scrubber and a pressure swing absorption unit, and a first outlet of the wet gas scrubber is fluidly connected to the one or more electric generators, and a second outlet of the wet gas scrubber is fluidly connected to a pressure swing absorption unit, and an outlet of the pressure swing absorption unit is fluidly connected to the one or more SOFC and the one or more MCFC.

2. The system of claim 1, wherein the wellhead associated gas processing system comprising a gas-liquid separator that separates oil and water in the associated gas and an emergency flare stack.

3. The system of claim 2, wherein the wellhead associated gas processing system further comprises a wellhead gas storage tank and a compressor station fluidly connected to the network of pipelines.

4. The system of claim 1, wherein the one or more electric generators are selected from a gas turbine generator, a bi-fuel generator, and a mixture thereof, wherein the bi-fuel generator uses a mixture of diesel and associated gas.

5. The system of claim 1, further comprises a steam turbine connected to a steam generator, wherein the steam generator is connected to a heat source comprises an exhaust from the one or more SOFC, and an exhaust from the one or more MCFC.

6. A method for utilizing wellhead associated gas using the system of claim 1, comprising:

processing, at each of the plurality of well sites, the associated gas generated at said well site to remove water therein to obtain a plurality of processed associated gas streams;

combining and delivering the plurality of processed associated gas streams to the central power plant through the network of pipelines;

purifying the combined processed associated gas in the wet scrubber to remove sulfur compounds therein to obtain a first purified associated gas;

feeding a first portion of the first purified associated gas to the one or more electric generators selected from a gas turbine generator, a bi-fuel generator, and a mixture thereof to generate electricity:

feeding a second portion of the first purified associated gas to the pressure swing absorption unit to produce a sulfur-free associated gas;

feeding the sulfur-free associated gas to the one or more SOFC and the one or more MCFC to generate electricity;

supplying the generated electricity from the one or more electric generators, the one or more SOFC, and the one or more MCFC to the local power grid that connects the central power station to the plurality of well sites.

7. The method of claim 6, further comprising mixing the processed or sulfur-free associated gas with diesel to form a fuel mixture; and fueling the bi-fuel generator with the fuel mixture.

8. The method of claim 6, further comprising heating a steam generator with an exhaust from the one or more SOFC and the one or more MCFC to generate a high-temperature steam; and driving a stream generator using the high-temperature steam to generate electricity.

9. The method of claim 6, further comprising deploying a mobile gas turbine generator or a mobile bi-fuel generator at one of the plurality of well sites; and generating electricity using the deployed mobile gas turbine generator or the deployed mobile bi-fuel generator.

10. The method of claim 6, further comprising combusting at least a portion of the processed associated gas or a portion of the sulfur-free associated gas in the flare system.

* * * * *